United States Patent
Martinez et al.

(10) Patent No.: US 10,439,186 B2
(45) Date of Patent: Oct. 8, 2019

(54) FLOODED LEAD-ACID BATTERY

(75) Inventors: Jesus Valenciano Martinez, Madrid (ES); Luca Brisotto, Torre de'Roveri (IT); Francisco Trinidad Lopez, Madrid (ES)

(73) Assignee: EXIDE TECHNOLOGIES, Milton, GA (US)

( * ) Notice: Subject to any disclaimer, the term of this patent is extended or adjusted under 35 U.S.C. 154(b) by 894 days.

(21) Appl. No.: 14/350,890

(22) PCT Filed: Oct. 11, 2011

(86) PCT No.: PCT/ES2011/070704
§ 371 (c)(1),
(2), (4) Date: Jun. 16, 2014

(87) PCT Pub. No.: WO2013/053957
PCT Pub. Date: Apr. 18, 2013

(65) Prior Publication Data
US 2014/0329137 A1    Nov. 6, 2014

(51) Int. Cl.
| H01M 2/14 | (2006.01) |
| H01M 2/16 | (2006.01) |
| H01M 2/18 | (2006.01) |
| H01M 4/14 | (2006.01) |
| H01M 4/20 | (2006.01) |
| H01M 10/08 | (2006.01) |
| H01M 10/12 | (2006.01) |

(52) U.S. Cl.
CPC .......... *H01M 2/14* (2013.01); *H01M 2/1673* (2013.01); *H01M 2/18* (2013.01); *H01M 4/14* (2013.01); *H01M 4/20* (2013.01); *H01M 10/08* (2013.01); *H01M 10/12* (2013.01); *H01M 2220/20* (2013.01); *H01M 2300/0011* (2013.01); *Y02T 10/7016* (2013.01)

(58) Field of Classification Search
None
See application file for complete search history.

(56) References Cited

U.S. PATENT DOCUMENTS

| 4,262,068 A | 4/1981 | Kono et al. |
| 4,342,343 A | 8/1982 | Clague et al. |
| 4,606,982 A | 8/1986 | Nelson et al. |

(Continued)

FOREIGN PATENT DOCUMENTS

| BE | 563166 | 6/1960 | |
| FR | 2937799 A1 * | 4/2010 | ............. H01M 4/14 |

(Continued)

OTHER PUBLICATIONS

Sulco Chemical Limited, sulfuric acid technical bulletin, 2002, p. 5.*

(Continued)

*Primary Examiner* — Daniel S Gatewood
(74) *Attorney, Agent, or Firm* — Cantor Colburn LLP

(57) ABSTRACT

A flooded lead-acid battery include a pasting substrate embedded into an active material of at least one surface of either the positive plates or the negative plates of each respective plurality, wherein the pasting substrate has an initial thickness. The pasting substrate thickness has a compressed thickness within the container that is at least 10 to 20% less than the initial thickness.

8 Claims, 1 Drawing Sheet

(56) References Cited

U.S. PATENT DOCUMENTS

| | | | |
|---|---|---|---|
| 6,531,248 B1 | 3/2003 | Zguris | |
| 2004/0018427 A1* | 1/2004 | Monconduit | H01M 6/5077 |
| | | | 429/205 |
| 2008/0138697 A1* | 6/2008 | Asada | C03C 14/002 |
| | | | 429/479 |
| 2011/0318643 A1* | 12/2011 | Clement | H01M 4/14 |
| | | | 429/247 |

FOREIGN PATENT DOCUMENTS

| | | |
|---|---|---|
| JP | S5533743 | 3/1980 |
| JP | S6116469 | 1/1986 |
| JP | H031518 | 1/1991 |
| JP | H06215795 | 8/1994 |
| JP | H06325744 | 11/1994 |
| JP | 2001068086 | 3/2001 |
| JP | 2002075433 | 3/2002 |
| JP | 2003151617 | 5/2003 |
| JP | 2003323878 | 11/2003 |
| JP | 2006086039 | 3/2006 |
| JP | 2006185678 | 7/2006 |
| WO | WO2010098796 | 9/2010 |
| WO | WO 2010098796 A1 * | 9/2010 ............ H01M 4/20 |

OTHER PUBLICATIONS

Japan Patent Application No. 2014-535127 Office Action—Notice of Reasons for Refusal dated Nov. 11, 2015, 14 pages.

International Application No. PCT/ES2011/070704 International Search Report dated Oct. 2, 2012, 7 pages.

ZVEI—working group industrial batteries: "Requirements for electrolyte and refilling water for lead acid batteries," ZVEI information leaflet No. 3e Edition Dec. 2011, 5 pages.

JP Patent Application No. 2014-535127 Notice of Reasons for Refusal dated Jun. 28, 2016, 8 pages.

European Application No. 11793848 Office Action dated Mar. 9, 2016, 3 pages.

* cited by examiner

FLOODED LEAD-ACID BATTERY

FIELD OF THE INVENTION

The present disclosure relates generally to the field of batteries, and more specifically to flooded lead-acid batteries.

BACKGROUND OF THE INVENTION

The need for improvements in lead-acid storage batteries is widely recognized. One example of a use in which a better battery is needed is in Hybrid Electric Vehicles (HEVs), such as micro-hybrid vehicles (μHEVs). Micro-hybrid vehicles are different from conventional vehicles, as they are designed to shut the engine off when the vehicle comes to a stop. The engine is then restarted immediately before the vehicle begins moving again. As a result, the lead-acid battery is forced to discharge during the period the engine is off to provide support for electrical loads in the vehicle and discharge at a high rate to start the vehicle. This will happen many times during a normal trip as opposed to only once for a conventional vehicle. The lead-acid battery therefore will discharge many times and be required to charge quickly in order to replenish the charge depleted during the stop event to allow the vehicle to complete another stop-start event. This new requirement for lead-acid battery is difficult to achieve.

Accordingly, a continual need exists for improved lead-acid batteries.

SUMMARY OF THE INVENTION

Disclosed herein are enhanced flooded lead-acid batteries.

In one embodiment, a flooded lead-acid battery, comprises a container; a plurality of positive plates disposed in the container; a plurality of negative plates disposed in the container; a pasting substrate embedded into an active material of at least one surface of either the positive plates or the negative plates of each respective plurality, wherein the pasting substrate has an initial thickness, wherein the pasting substrate thickness has a compressed thickness within the container that is at least 10 to 20% less than the initial thickness; and an electrolyte disposed in the container to a sufficient level to flood the plurality of positive and negative plates.

In one embodiment, a flooded lead-acid battery, comprises a container; a plurality of positive plates disposed in the container; a plurality of negative plates disposed in the container; a pasting substrate embedded into an active material of at least one surface of either the positive plates or the negative plates of each respective plurality, wherein the pasting substrate has a basis weight of 23 g/m$^2$ to 31 g/m$^2$ and the pasting substrate comprises greater than about 50 wt. % glass fibers based on a total weight of the pasting substrate; and an electrolyte disposed in the container to a sufficient level to flood the plurality of positive and negative plates.

In one embodiment, a flooded lead-acid battery, comprises a container; a plurality of positive plates disposed in the container; a plurality of negative plates disposed in the container; a non-woven substrate comprising glass fiber embedded into an active material of at least one plate from either of the plurality of negative plates and the plurality of positive plates, wherein the non-woven substrate has a basis weight of 23 g/m$^2$ to 31 g/m$^2$ and comprises a blend of fibers having an average fiber diameter of 5 μm to 8 μm with fibers having an average fiber diameter of 11 to 14 μm; and an electrolyte disposed in the container to a sufficient level to flood the plurality of positive and negative plates.

The above-described and other features will be appreciated and understood by those skilled in the art from the following detailed description, drawing, and appended claims.

BRIEF DESCRIPTION OF THE DRAWINGS

Referring now to the figures, which are exemplary embodiments, and wherein like elements are numbered alike.

DETAILED DESCRIPTION OF THE INVENTION

Disclosed herein are enhanced flooded lead-acid batteries having a number of improvements (e.g., improved cycle life) compared to conventional flooded lead-acid batteries. As will be discussed in greater detail below, a number of features have been identified that independently and/or in combination with each other result in batteries that can be used in high cycle applications (e.g., stop-start vehicle applications). While embodiments disclosed herein can be particularly beneficial for micro-hybrid electric vehicles, it is to be understood that other applications (e.g., motive power and photovoltaic) are within the scope of the claimed invention.

Figure 1:
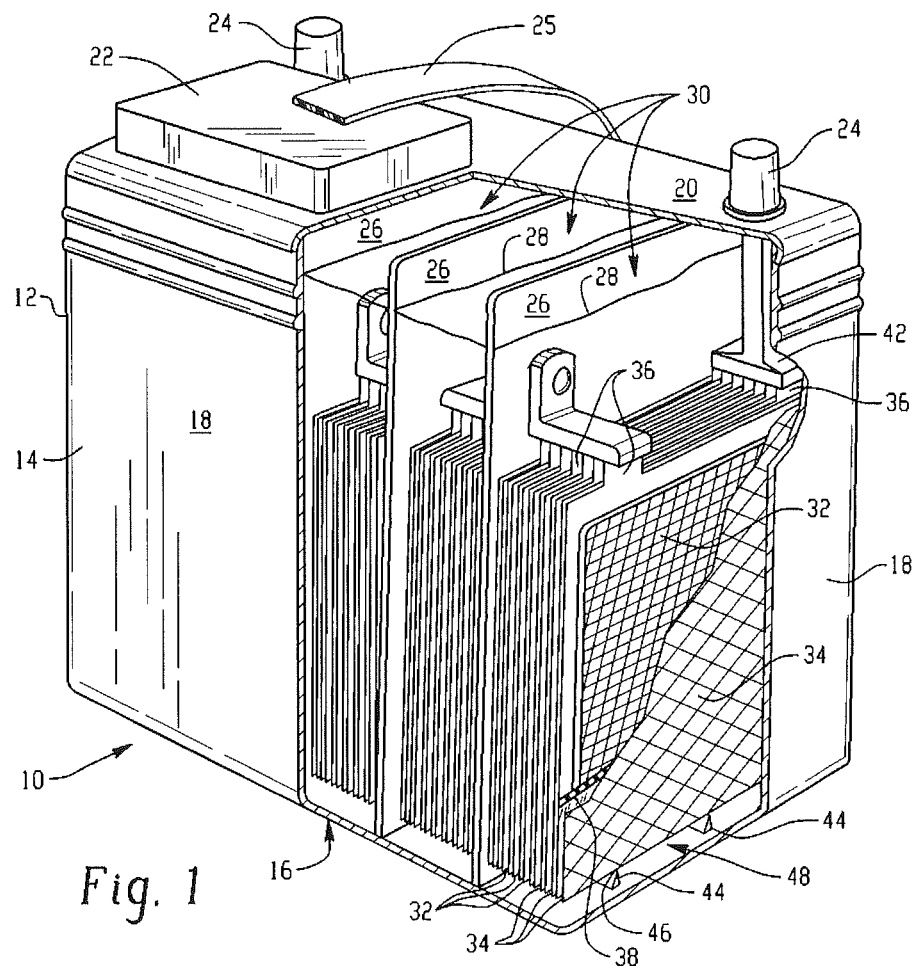
FIG. 1 is a perspective view of a lead-acid battery, a portion of which is cut away to show the inside components of the battery.
Figure 2:
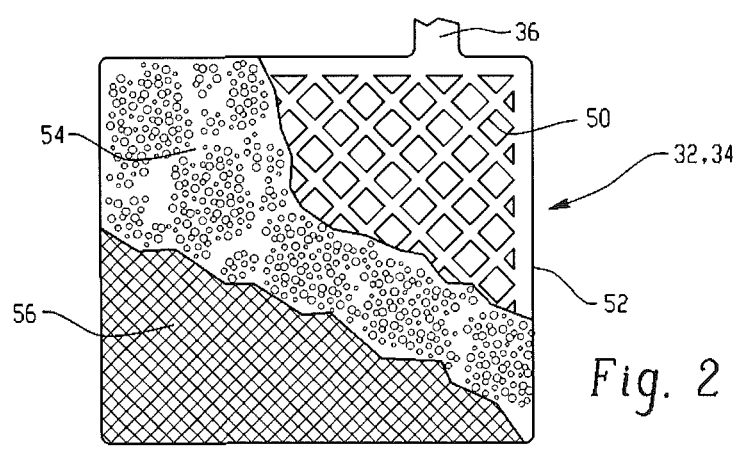
FIG. 2 is a front view of a battery plate, with a portion of the underlying grid shown as exposed for illustrative purposes.

Referring now to FIGS. 1-2, an exemplary embodiment of an enhanced flooded lead-acid battery generally designated 10 is disclosed. The lead-acid battery 10 includes a container 12. The shape of the container 12 can vary depending on design parameters, but is illustrated as having a generally rectangular shape. The container 12 includes a bottom container 14 having a bottom floor 16 and four side walls 18, and a top panel cover 20 that seals the top of the container 12 to prevent leakage of the acid fluid from the container 12. The top panel cover 20 can include one or more vent holes (not shown) and vent caps 22 that permit gases generated within the battery housing to escape. Suitable materials for the container 12 included electronically non-conductive materials such as polymeric materials.

Unlike conventional flooded batteries, in one embodiment, the container 12 is designed to accommodate higher (compared to conventional flooded batteries) stack compression. For example, the thickness of the side walls 18 can be thicker compared to the side walls of conventional flooded batteries. In one embodiment, the enhanced flooded battery has a stack compression of at least 10% to 20%, specifically 10% to 15%. While the stack compression can be obtained as a result of compressing a pasting substrate (discussed in detail below), other means of providing compression are envisioned to be within the scope of the claimed invention.

Positive and negative conductive posts 24 extend up through the top panel cover 20 to allow for electrical clamps to connect to the battery in operation. The container 12 can optionally include a strap (25 as illustrated), handle or other battery lifting device to facilitate handling of the battery.

The components inside of the container 12 include several partition walls 26 that extend vertically through the container bottom 14 and partition the container bottom 14 into a plurality of separate cell compartments. These partition walls are generally sealed to the interior surfaces of the bottom floor 16, to the top panel cover 20 and to the front and back side walls 18 of the container to prevent seepage of acid fluid 28 (also referred to as electrolyte 28) past the partition walls 26.

In one embodiment, the electrolyte 28 comprises sulfuric-acid. In one embodiment, the electrolyte comprises sulfuric acid in amount such that the electrolyte has a specific gravity of 1.260 to 1.300 grams per cubic centimeter (g/cm$^3$) measured at 15° C. in a fully charged state. In other embodiments, it can be desirable for the electrolyte to have a specific gravity less than 1.280 g/cm$^3$ measured at 15° C. in a fully charged state. The electrolyte 28 is present in an amount sufficient to flood the negative plates 32 and positive plates 34. The exact amount of electrolyte 28 can vary depending on the desired application.

In one embodiment, the partitioned walls 26 and the walls 18 of the container 12 form cell compartments 30 that each contain a vertical stack of alternating negative plates 32 and positive plates 34, which are described in more detail in connection with FIG. 2. Unlike conventional flooded lead-acid batteries, a pasting substrate comprising glass fibers is embedded into the active material of one or more surfaces of the negative plates 32 and/or the positive plates 34. The degree to which the pasting substrate is embedded into the active material can vary depending on design. In one embodiment, the pasting substrate has at least 5 percent (%) of its nominal thickness embedded into the active material. In another embodiment, the pasting substrate has at least 10% of its nominal thickness embedded into the active material. In one embodiment, 20% to 100% of the nominal thickness is embedded into the active material, specifically 50% to 75%. In one embodiment, at least 50% of the nominal thickness is embedded into the active material. In other embodiments, it is desirable to have less than the entire nominal thickness embedded into the active material. Specifically, less than 90% of the nominal thickness is embedded into the active material, specifically 10% to 90%. The pasting substrate is embedded into the active material while the active material is still in a wet state.

In one embodiment, the pasting substrate has some degree of elasticity such that it can be compressed within container 12. For example, the pasting substrate has an initial thickness, wherein the pasting substrate thickness has a compressed thickness within the container that is at least 10% to 20%, specifically 10% to 15%, less than the initial thickness. In one embodiment, the substrate comprises glass fibers, but in some embodiments the pasting substrate can comprise no glass fibers.

Without wanting to be bound to theory, it is believed by embedding a pasting substrate comprising glass fibers into the active material a number of advantages over conventional pasting paper comprising cellulose can be obtained. Specifically, it is believed that the pasting substrate comprising glass fiber improves acid transport compared to conventional pasting papers by providing a pathway of acid flow into the active material. Since the glass fibers do not dissolve in the acid electrolyte, they are able to remain in contact with the active material to provide enhanced plate strength and structural integrity to the active material. Additionally, it is believed that compared to pasting substrates comprising substantially polymeric fibers, glass fibers withstand the oxidizing environment of the positive plates better.

In various embodiments, the pasting substrate can be used with or in addition to traditional pasting paper. For example, in various embodiments, the pasting substrate can be used in place of conventional pasting paper in connection with some or all of the positive plates only. In various other embodiments, the pasting substrate can be used in place of conventional pasting paper in some or all of the negative plates only. In other embodiments, some or all of both the negative plates 32 and positive plates 34 employ the pasting substrate disclosed herein. In yet other embodiments, the pasting paper substrate can be a distinct component of the battery apart from a separator 38. In other embodiments, the pasting substrate can be an integral part of the separator 38 such as a layer that is part of the separator 38 or acts as the separator 38. In other words, embodiments are envisioned wherein the pasting substrate acts as support during the pasting process and a separator when the plates are disposed within the battery.

In one embodiment, the pasting substrate comprises greater than 50 wt. % glass fibers based on a total weight of the pasting substrate, and more desirable greater than 75 wt. %. In other embodiments, the pasting substrate is substantially free of glass fibers and comprises a thermoplastic resin, such as polyesters and polypropylene. Glass fibers can have benefits for some applications, while thermoplastic fibers can be acceptable for other applications. Embodiments are envisioned where blends of glass fibers and thermoplastic fibers are employed. Other embodiments are envisioned in which glass fibers and or thermoplastic fibers are blended with cellulosic fibers.

In one embodiment, the fibers can have an average fiber diameter of 5 micrometers (μm) up to 16 μm, specifically the fiber can comprise a blend of fibers having an average fiber diameter of 5 μm to 8 μm (first diameter fibers) with fibers having an average fiber diameter of 11 to 14 μm (second diameter fibers). In one specific embodiment, the ratio of first diameter fibers to second fibers is 2:1 to 1:2, even more specifically in one embodiment the ratio of first diameter fibers to second diameter fibers is approximately 1:1 (plus or minus 10%).

In addition to fiber diameter, fiber length is another variable of the fiber that can be varied to obtain the desired performance. In one embodiment, the fiber can have an average fiber length of 5 millimeters (mm) to 16 millimeters and can comprise a blend of fiber lengths. For example, in one embodiment, the fibers comprise a blend of fibers having an average fiber length of 5 millimeters to 7 millimeters (first length fibers) with fibers having an average fiber length of 11 millimeters to 14 millimeters (second length fibers). In one specific embodiment, the ratio of first length fibers to second length fibers is 2:1 to 1:2, even more specifically in one embodiment the ratio of first length fibers to second length fibers is approximately 1:1 (plus or minus 10%).

In one embodiment, the fibers can have average fiber diameter/length ratios of 11 micrometers (μm)/13 mm to 13 μm/13 mm. In one embodiment, the pasting substrate has a basis weight of 23 gram per squared meter (g/m$^2$) to 31 g/m$^2$ and can have a thickness of 0.12 millimeters (mm) to 0.25 mm measured at 10 kPa. The pasting substrate can be formed by a number of different processes. In one particular embodiment, the pasting substrate is a non-woven substrate comprising glass fibers.

In one embodiment, the battery negative plates 32 are enclosed within a porous polymeric separator 38, which separate the negative plates 32 from the positive plates 34. In another embodiment, the battery positive plates 34 are enclosed within a polymeric separator 38. The separator can be, for example, an envelope separator, or alternatively a loose-leaf separator. In various embodiments, the separator comprises a polyolefin. Examples of polyolefins that can be used include, but are not limited to, polyethylene, polypropylene, polybutene, ethylene-propylene copolymers, ethylene-butene copolymers, propylene-butene copolymers, and ethylene-propylene-butene copolymers.

As further illustrated in FIG. 1, lugs or tabs 36 provide an electrical connection contact. The negative plates 32 are commonly connected by through-the-partition connectors 40 that are in electrical contact with the plate lugs. Similarly, a post strap connector 42 is attached to the bottom of the negative post and also in electrical contact with plate lugs. The positive plates 34 are similarly connected through the partition connectors and a post strap attached to the positive post.

The bottom edges of the plates 32, 34 can optionally be supported by element rests 44 that can sit underneath the plates on the bottom floor 16 of the bottom container 14. In one embodiment, the plates 32, 34, especially the unenveloped positive plates, can be anchored to the element rests by a bonding material 46, such as a resin epoxy, hot melt adhesive or a mechanical fastener such as straps, tapes, blocks, or other bonding material or fastener that prevents movement of the plates 32, 34 in the container 12. The element rests hold the bottom of the plates off the bottom surface of the cells so that a sediment sump 48 below the plates can contain any debris or other foreign material and separate and hold that material away from the plates.

FIG. 2 shows a representative battery plate 32, 34 in which a portion of the active material has been removed from the underlying plate grating 50 to show the grid structure of the plate that provides a frame that supports the active material. In some embodiments, the plate can have edges 52 on two or four sides for structural support. The grid pattern can vary depending on various design parameters. The underlying plate grating can be formed of a conductive material, typically lead or a lead alloy. The pattern shown in FIG. 2 is merely for illustration. The underlying plate grating 50 can be formed according to any number of processes and is not intended to limit the scope of the presently claimed invention. For exemplary purposes, the grid can be formed by (1) batch processes such as book mold gravity casting; and (2) continuous processes such as strip expansion, strip stamping, continuous casting, and continuous casting followed by rolling.

The active material 54, often referred to as a paste in the wet state, is typically a lead-based material (e.g., PbO, $PbO_2$, Pb or $PbSO_4$ at different charge/discharge states of the battery). The active material is applied to the underlying plate grating 50 as a paste and the pasting substrate 56 is embedded into the active material as discussed above while the paste is in a wet state. In FIG. 2, the pasting substrate 56 is thematically represented with cross-hatching for illustrative purposes.

As discussed briefly above, enhanced flooded lead-acid batteries that are designed according to embodiments of this disclosure can extend serviceable life of the battery and/or meet higher cycling requirements compared to conventional flooded lead-acid batteries. Additionally, the use of pasting substrate can offer a number of continuous processing opportunities and handling benefits during the manufacturing process.

While the invention has been described with reference to an exemplary embodiment, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A flooded lead-acid battery, comprising:
a container;
a plurality of positive plates disposed in the container;
a plurality of negative plates disposed in the container;
a pasting substrate embedded into an active material of at least one surface of either the positive plates or the negative plates of each respective plurality, wherein the pasting substrate has a basis weight of 23 $g/m^2$ to 31 $g/m^2$ and the pasting substrate and comprises greater than about 50 wt. % glass fibers based on a total weight of the pasting substrate, wherein the pasting substrate comprises a blend of fibers having an average fiber diameter of 5 µm to 8 µm with fibers having an average fiber diameter of 11 to 14 µm, wherein the pasting substrate thickness has a compressed thickness within the container that is at least 10 to 20% less than the initial thickness; and
an electrolyte disposed in the container to a sufficient level to flood the plurality of positive and negative plates.

2. The flooded lead-acid battery according to claim 1, wherein the pasting substrate comprises a blend of fibers having an average fiber length of 5 millimeters to 7 millimeters with fibers having an average fiber length of 11 millimeters to 14 millimeter.

3. The flooded lead-acid battery according to any one of claims 1 and 2, wherein the pasting substrate is a non-woven substrate comprising glass fibers.

4. The flooded lead-acid battery according to claim 3, wherein the glass fibers have an average diameter/fiber length ratios of 11 micrometers/13 mm to 13 micrometers/13 mm.

5. The flooded lead-acid battery according to claim 1, wherein the electrolyte comprises sulfuric acid in an amount such that the electrolyte has a specific gravity of 1.260 to 1.300 $g/cm^3$ measured at 15° C. in a fully charged state.

6. The flooded lead-acid battery according to claim 5, wherein the electrolyte has a specific gravity less than 1.280 $g/cm^3$ measured at 15° C. in a fully charged state.

7. The flooded lead-acid battery according to claim 1, further comprising an additional separator disposed in the container between each of the plurality of positive plates and each of the plurality of negative plates.

8. The flooded lead-acid battery according to claim 7, wherein the pasting substrate has a thickness of 0.12 mm to 0.25 mm measured at 10 kPa.

* * * * *